Patented Sept. 1, 1925.

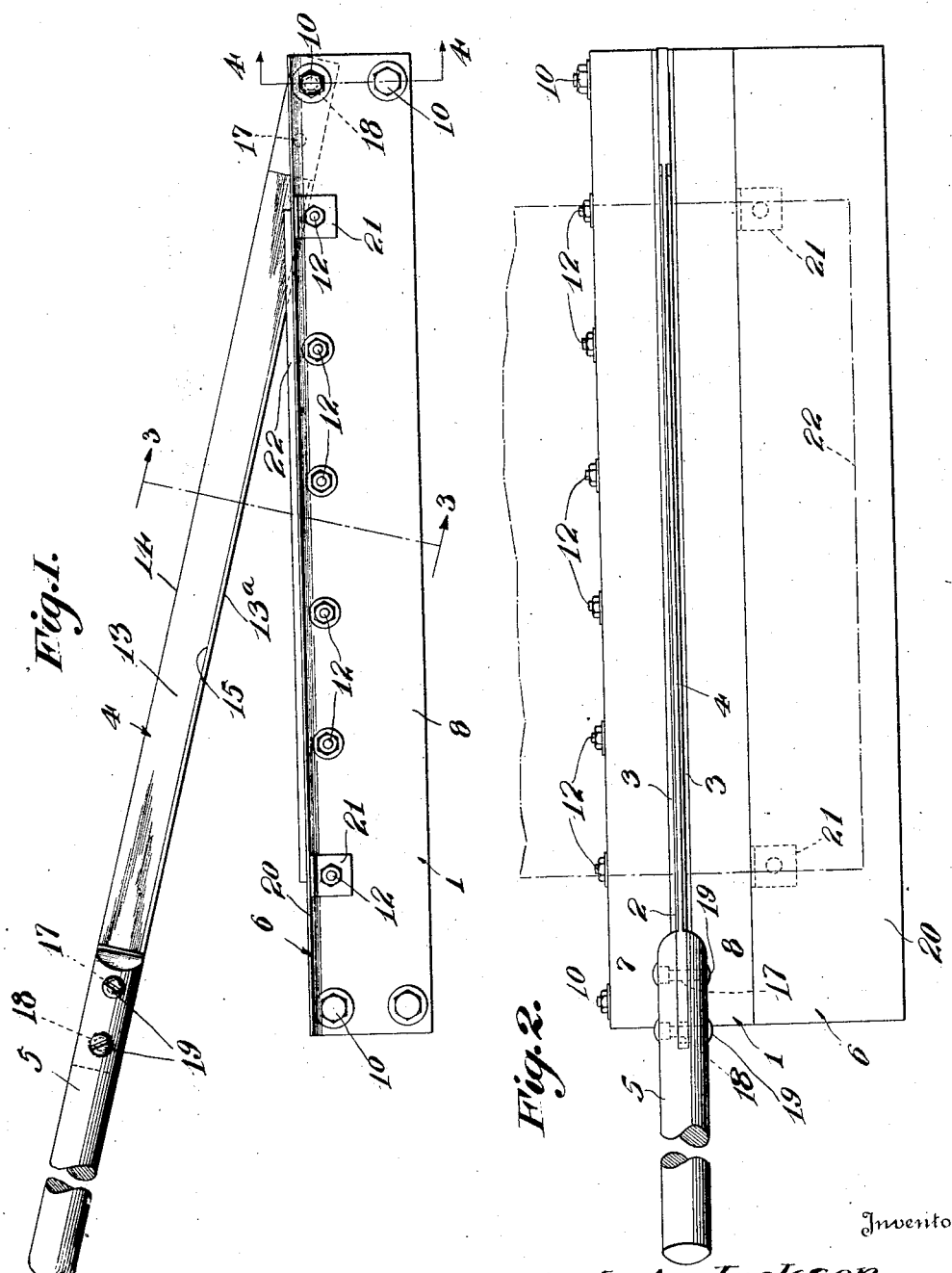

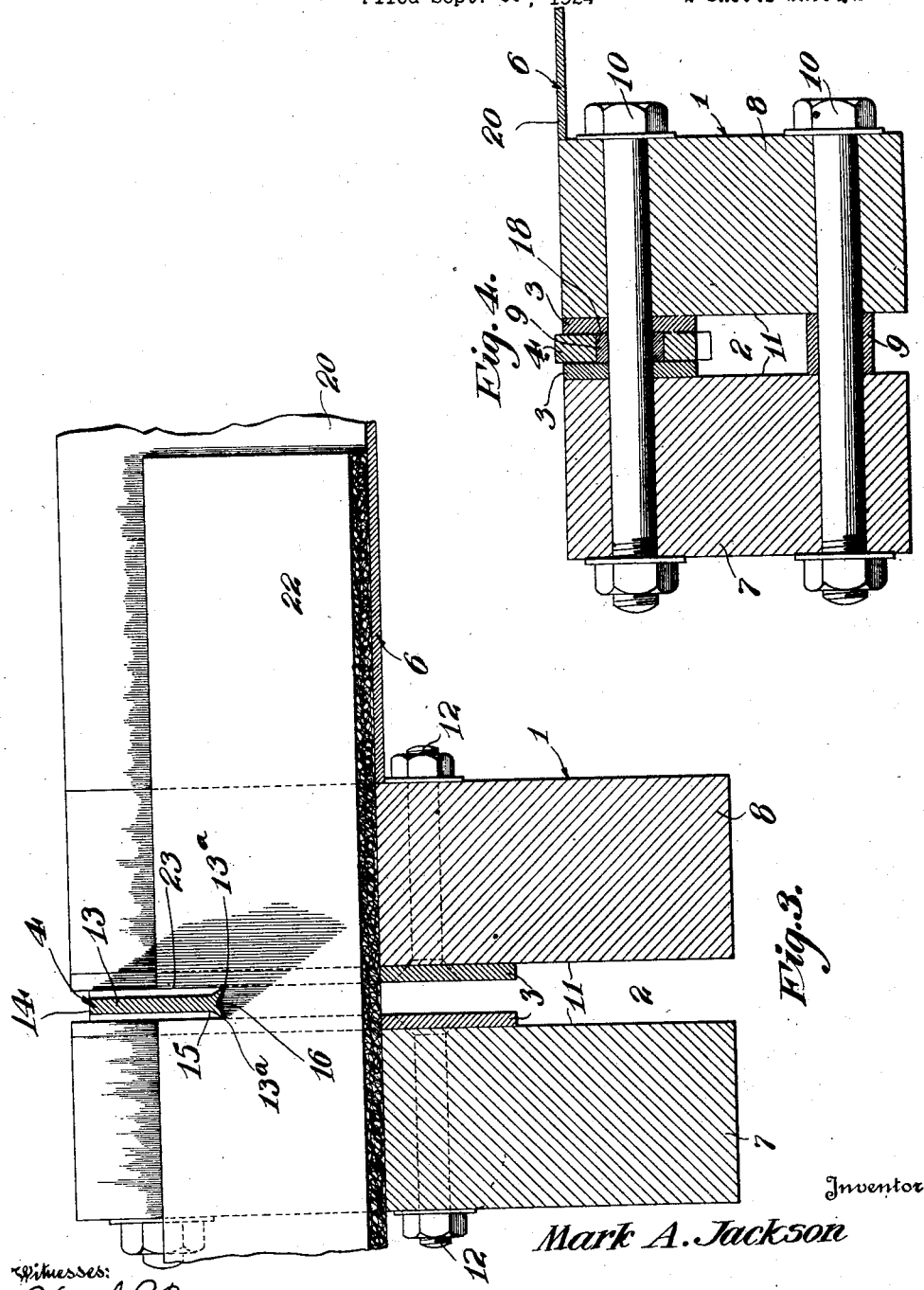

1,552,165

UNITED STATES PATENT OFFICE.

MARK A. JACKSON, OF COLLINGSWOOD, NEW JERSEY.

SHEARS.

Application filed September 30, 1924. Serial No. 740,721.

*To all whom it may concern:*

Be it known that I, MARK A. JACKSON, a citizen of the United States, residing at Collingswood, in the county of Camden and State of New Jersey, have invented certain new and useful Improvements in Shears, of which the following is a specification.

My invention relates to shears for cutting slate asbestos or other brittle sheet material. The objects are to provide shears with which slate and asbestos or other brittle sheet material, may be quickly and accurately cut without cracking or breaking the same; which includes a blade so constructed that it may be changed, end for end, when one end is worn; which will have an extension for supporting a cut part of the sheet material, and which may be attached to either side of the shears for use by a right or left handed operator.

These objects, and other advantageous ends which will be described hereinafter, I attain in the following manner, reference being had to the accompanying drawings, in which—

Figure 1 is a side elevation of shears constructed in accordance with my invention, Figure 2 a plan view of the shears shown in Figure 1, Figure 3 an enlarged section taken on line 3—3 of Figure 1, and Figure 4 an enlarged section taken on line 4—4 of Figure 1.

Referring to the drawings, 1 indicates a frame having a slot 2, 3 a pair of shearing blades secured within the slot, 4 a main shearing blade pivoted to the frame, 5 a detachable handle on the blade and 6 a frame extension which may be detachably secured to either side of the frame.

Frame 1 consists of a pair of frame members 7 and 8 having spacers 9 therebetween and a bolt 10 passing through the frame members and each spacer.

The shearing blades 3 are preferably made from steel strips and secured to the adjacent sides 11 of the frame members by bolts 12 having countersunk heads. The ends of the shearing blades 3 preferably have the upper spacer 9 therebetween to insure accurate spacing.

The main blade 4 is preferably made from a steel strip and has a shank 13 of a less thickness than the shearing edges 13$^a$. This shank is of uniform thickness from the top edge 14 to a point 15 near the shearing edges. From this point 15 the shank increases in thickness to shearing edges 13$^a$ at opposite sides of the blade. A shallow V-shaped groove 16 is preferably cut in the bottom edge of the blade between the shearing edges 13$^a$. Each end of the blade is provided with suitable apertures 17 and 18 for detachably securing handle 5 thereto and for pivoting the blade to the frame. As shown, one end of blade 4 is pivoted on the upper spacer 9, the spacer passing through aperture 18. The other end of the blade has the detachable handle 5 secured thereto by a pair of bolts 19 passing through apertures 17 and 18.

The frame extension 6 consists of a plate 20 having clips 21 secured thereto which may be detachably secured to either of the frame members 7 and 8. As shown, these clips are secured to frame member 8 by the bolts 12 for use by a right handed operator, and may be likewise secured to the frame member 7 for use by a left handed operator.

To cut brittle sheet material, such as slate or asbestos shingles, the shingle is placed on the top of frame 1 under the main blade 4 as shown at 22. The blade is then swung on its pivot by moving handle 5 downward so that the shearing edges 13$^a$ will shear a slit in the shingle as shown at 23. The shearing is effected by each of the edges 13$^a$ at opposite sides of the blade and the upper edges of the shearing blades 3. Blade 4 is swung downward as far as possible by the operator, the distance depending on the force applied to the handle. The usual distance is substantially as shown in Figure 1. After a short slit, as shown in Figures 1 and 3, is cut in the shingle by the first swing of blade 4, the blade is raised and the shingle slid along and under the blade as far as possible. The shingle may be easily slid along under the blade, because the shank, being of reduced thickness, avoids binding with the sides of the slit. The only parts of the blade engaging the sides of the slit, are the shearing edges 13$^a$. They allow free sliding movement of the shingle along the blade even if the shingle be unavoidably shifted to one side by the operator during the sliding. The main blade 4 is then moved downward as before until the shingle is cut in two. One cut part of the shingle is held by the operator and the other cut part is supported by frame member 8 and extension 6.

When the blade is worn and the shearing edges are dull, it may be changed, end for end, by removing bolts 19 from the handle and the bolt 10 which forms the pivot. The apertures in each end of the blade, being similar, will accurately fit the pivot and the handle when the blade is changed.

When a right handed operator is using the shears, extension 6 is attached as shown in the drawings. When a left handed operator is using the shears, extension 6 is attached to the other side of the frame by detaching the clips 21 from the bolts 12 on one side of the frame and attaching them to the bolts 12 on the other side of the frame.

It will be seen that with the shears above described, brittle sheet material may be easily and quickly cut without breaking because a slight unavoidable side shifting of the material as it is moved under the main blade will not cause the sides of the slit to bind against the sides of the shank, and the cut part of the material, which is not held by the operator, will be supported by the frame extension 6. Either end of the blade may be pivoted to either end of the frame, thus insuring long life of the blades.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Shears including a frame having a slot; a shearing blade secured to each side of the slot; a main blade having a shank of less thickness than the shearing edge, pivoted to the frame and adapted to swing between the shearing blades, and a detachable handle adapted to be secured to either end of the main blade, the shank being of uniform thickness from the top edge to a point near the shearing edge and increasing in thickness from said point to the shearing edge, the main blade having apertures at each end for attaching the handle and for receiving the pivot for the blade.

2. Shears including a pair of frame members; spacers between the frame members; securing means passing through the frame members and each spacer; shearing blades secured to the adjacent sides of the frame members, and a main blade pivoted on a spacer and adapted to swing between the shearing blades.

3. Shears including a pair of spaced frame members; means securing the members to each other; a shearing blade at each adjacent side of the frame members; a main blade pivoted to the frame members and adapted to swing between the shearing blades; a frame extension adapted to be secured to either frame member, and common means for securing a shearing blade and the extension to either side of the frame.

In testimony whereof I have signed my name to this specification.

MARK A. JACKSON.